L. HOESING.
ATTACHMENT FOR HAY SWEEPS.
APPLICATION FILED AUG. 29, 1919.

1,340,391.

Patented May 18, 1920.
2 SHEETS—SHEET 1.

Witness
F. B. Wooden

Inventor,
L. Hoesing
By C. A. Snow & Co.
Attorneys.

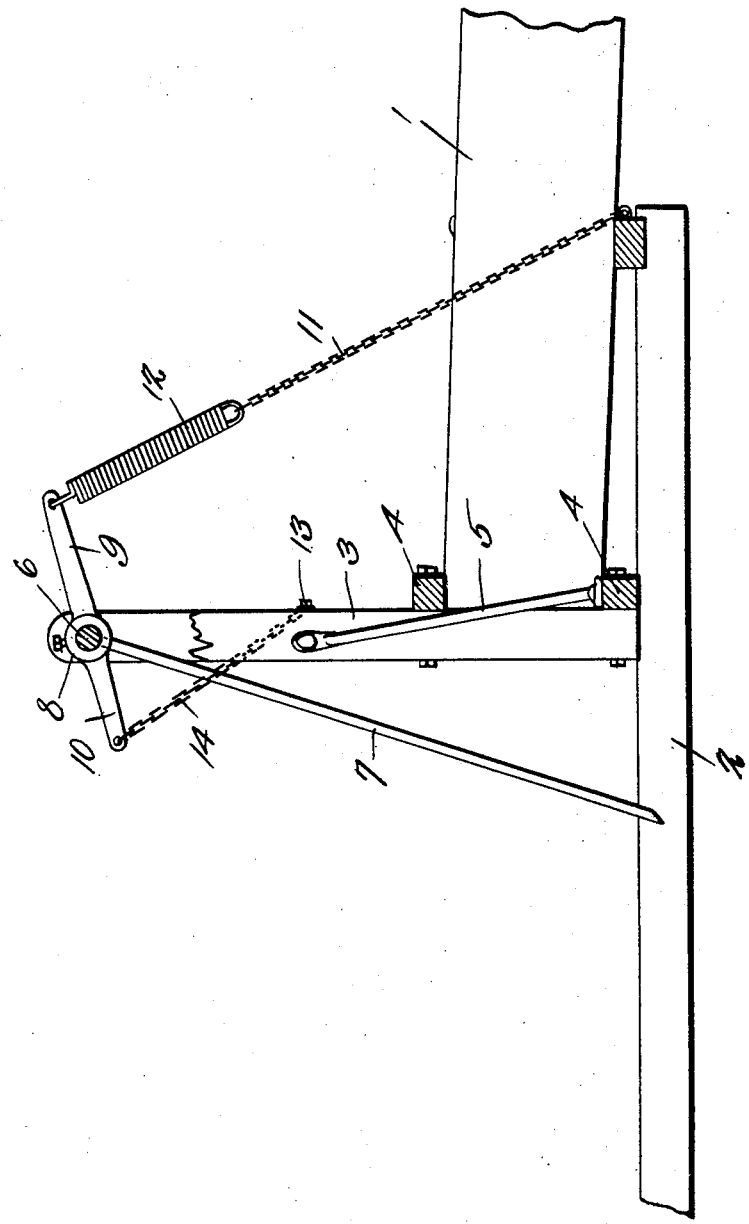

UNITED STATES PATENT OFFICE.

LOUIS HOESING, OF CROFTON, NEBRASKA.

ATTACHMENT FOR HAY-SWEEPS.

1,340,391.　　　　Specification of Letters Patent.　　Patented May 18, 1920.

Application filed August 29, 1919. Serial No. 320,622.

*To all whom it may concern:*

Be it known that I, LOUIS HOESING, a citizen of the United States, residing at Crofton, in the county of Knox and State of Nebraska, have invented a new and useful Attachment for Hay-Sweeps, of which the following is a specification.

This invention relates to attachments for hay sweeps and has for its object the provision of a device for assisting in the removal of hay from the fingers of the hay sweep when the sweep is backed away from the stacker.

It is a further object of the present disclosure to improve generally and to enhance the utility of devices of that class to which the present invention appertains, it being understood that slight changes may be made in the device within the scope of what is claimed without departing from the spirit or sacrificing any of the advantages of the invention.

In the drawing forming a part of this specification—

Fig. 2 is a transverse sectional view.

Figure 1:
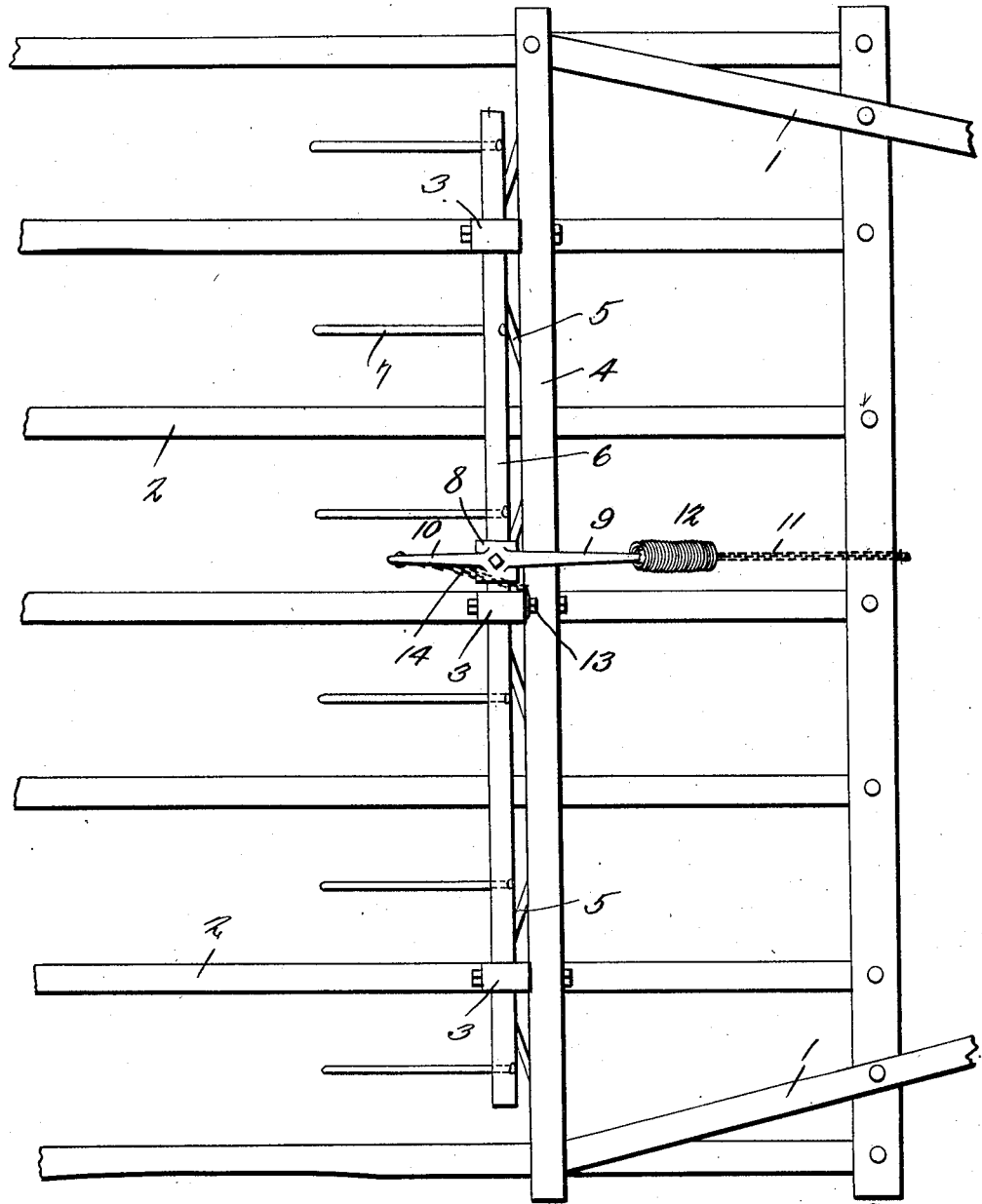
Figure 1 is a plan view of the device.

Referring to the drawings by characters of reference there is shown at 1 a portion of the frame of a hay sweep having fingers 2. Standards 3 are mounted on the fingers, being connected by cross beams 4 and having braces 5. A shaft 6 is mounted for rotation in the upper end of the standards 3 and is provided with a plurality of tines 7. The tines extending downwardly and outwardly toward the forward end of the sweep between the fingers 2. A collar 8 secured to the shaft 6 intermediate its ends is provided with oppositely extended arms 9 and 10. The arm 9 is connected to the frame of the sweep by a chain 11, a spring 12 being connected to the lever 9 and to the chain 11. The arm 10 is connected at 13 to one of the standards 3 by a chain 14. The chain 14 limits the forward swing of the tines 7 under the action of the spring 12.

In practical operation the sweep is moved along the ground, the hay gathered on the fingers exerting sufficient pressure on the tines 7 to force the same back against the tension of the spring 12, the weight of the load of hay being sufficient to prevent the spring acting to discharge the hay. When the stack or other point of discharge is reached and the sweep backed away from the same, that portion of the hay projecting downwardly between the fingers will engage the ground and the hay resting against the tines 7 will be pushed from the fingers 2 by the tines and the entire load will be discharged.

Having thus described the invention what is claimed is:—

1. The combination with a hay sweep, of a shaft mounted for oscillation above the fingers of the sweep, tines secured to the shaft, and means for permitting resilient movement of the tines in a rearwardly direction.

2. The combination with a hay sweep having collecting fingers, of a shaft mounted for oscillation above the sweep, tines secured to the shaft the tines extending downwardly to engage material on the fingers, a lever carried by the shaft, and resilient means for oscillating the shaft, to swing the tines toward the end of the fingers.

3. The combination with a hay sweep, of a standard mounted on the sweep, an oscillatory shaft mounted on the standard, tines connected to the shaft and extended downwardly and forwardly to engage material on the sweep, resilient means for oscillating the shaft to urge the tines in a forward direction, said means being placed under tension by the entry of material on the sweep and means for limiting the said forward movement of the tines.

4. The combination with a hay sweep of a shaft mounted for oscillatory movement above the sweep, tines secured to the shaft and extending downwardly and forwardly to engage material on the sweep, forwardly and rearwardly extending levers connected to the shaft, resilient means connected to the rearwardly extending lever for urging the tines in a forward direction and means secured to the forwardly extending lever for limiting the forward movement of the tines under the action of the resilient means.

In testimony that I claim the foregoing as my own I have hereto affixed my signature in the presence of two witnesses.

LOUIS HOESING.

Witnesses:
　A. F. TUCKER,
　Jos. MCEWING.